United States Patent
Cady et al.

(10) Patent No.: US 8,519,965 B2
(45) Date of Patent: Aug. 27, 2013

(54) MULTI-TOUCH DETECTION PANEL WITH DISAMBIGUATION OF TOUCH COORDINATES

(75) Inventors: Andrew N Cady, Chicago, IL (US); Tomohiro Ishikawa, Evanston, IL (US); Robert D Polak, Lindenhurst, IL (US)

(73) Assignee: Motorola Mobility LLC, Libertyville, IL (US)

( * ) Notice: Subject to any disclaimer, the term of this patent is extended or adjusted under 35 U.S.C. 154(b) by 984 days.

(21) Appl. No.: 12/107,820

(22) Filed: Apr. 23, 2008

(65) Prior Publication Data

US 2009/0267903 A1  Oct. 29, 2009

(51) Int. Cl.
*G06F 3/041* (2006.01)

(52) U.S. Cl.
USPC ........ 345/173; 345/174; 345/179; 178/18.05; 463/37

(58) Field of Classification Search
USPC .............. 345/156, 173–174, 179; 178/18.01, 178/18.03, 18.05–18.07, 19.01, 8.01, 19.03–19.041; 463/37
See application file for complete search history.

(56) References Cited

U.S. PATENT DOCUMENTS

| | | | | |
|---|---|---|---|---|
| 5,159,159 A * | 10/1992 | Asher | ......................... | 178/18.05 |
| 5,367,199 A | 11/1994 | Lefkowitz et al. | | |
| 5,719,597 A * | 2/1998 | Fong | ............................... | 345/174 |
| 5,748,185 A * | 5/1998 | Stephan et al. | ................ | 345/173 |
| 6,137,427 A * | 10/2000 | Binstead | ........................... | 341/33 |
| 6,144,358 A * | 11/2000 | Narayanaswamy et al. | ... | 345/102 |
| 6,476,797 B1 * | 11/2002 | Kurihara et al. | ............... | 345/173 |
| 6,597,347 B1 * | 7/2003 | Yasutake | ........................ | 345/173 |
| 6,943,705 B1 * | 9/2005 | Bolender et al. | ................. | 341/33 |
| 7,046,230 B2 | 5/2006 | Zadesky et al. | | |
| 7,075,513 B2 * | 7/2006 | Silfverberg et al. | .......... | 345/157 |
| 7,215,330 B2 * | 5/2007 | Rantet | ........................... | 345/173 |
| 7,518,381 B2 * | 4/2009 | Lamborghini et al. | ........ | 324/679 |
| RE40,867 E * | 8/2009 | Binstead | ......................... | 341/33 |
| 8,265,688 B2 * | 9/2012 | Hamadene et al. | ......... | 455/550.1 |
| 2002/0196238 A1 * | 12/2002 | Tsukada et al. | ................ | 345/173 |
| 2003/0043123 A1 * | 3/2003 | Hinckley et al. | ............... | 345/173 |
| 2004/0119701 A1 * | 6/2004 | Mulligan et al. | ............... | 345/173 |

(Continued)

FOREIGN PATENT DOCUMENTS

EP  1892605 A2  2/2008
GB  2439554 A  1/2008

(Continued)

OTHER PUBLICATIONS

Steven J. Vaughan Nichols, New Interfaces at the Touch of a Fingertip, Computer, Aug. 2007, pp. 12-15, vol. 40, Issue 8, published by the IEEE Computer Society.

(Continued)

*Primary Examiner* — Lun-Yi Lao
*Assistant Examiner* — Kelly B Hegarty
(74) *Attorney, Agent, or Firm* — Philip A. Premysler; Sylvia Chen

(57) ABSTRACT

An multi-touch detection system (100) separately determines each of the coordinates of multiple touches and is able to correctly pair the coordinates, the touch panel includes multiple (e.g., two or four) separate sections (104, 106, 404, 406, 504, 506, 508, 510) to detect touches in different areas. The system (100) is able to operate at high refresh rates allowing speed sensitive applications to be supported.

16 Claims, 5 Drawing Sheets

(56) References Cited

U.S. PATENT DOCUMENTS

| | | | |
|---|---|---|---|
| 2005/0280627 A1* | 12/2005 | Koshimizu et al. | 345/156 |
| 2006/0026521 A1 | 2/2006 | Hotelling et al. | |
| 2006/0097991 A1 | 5/2006 | Hotelling et al. | |
| 2006/0187142 A1* | 8/2006 | Lesniak | 345/1.1 |
| 2006/0232557 A1* | 10/2006 | Fallot-Burghardt | 345/168 |
| 2006/0262101 A1* | 11/2006 | Layton et al. | 345/173 |
| 2006/0274055 A1* | 12/2006 | Reynolds et al. | 345/174 |
| 2007/0188474 A1 | 8/2007 | Zaborowski | |
| 2007/0240914 A1* | 10/2007 | Lai et al. | 178/18.06 |
| 2008/0117179 A1* | 5/2008 | Noh | 345/173 |
| 2009/0213081 A1* | 8/2009 | Case, Jr. | 345/173 |
| 2009/0231288 A1* | 9/2009 | Liao | 345/173 |
| 2009/0267903 A1* | 10/2009 | Cady et al. | 345/173 |
| 2009/0284474 A1* | 11/2009 | Komaki et al. | 345/173 |
| 2009/0295753 A1* | 12/2009 | King et al. | 345/174 |
| 2009/0301795 A1* | 12/2009 | Ko | 178/18.03 |
| 2010/0127992 A1 | 5/2010 | Schmid | 345/173 |
| 2011/0012853 A1* | 1/2011 | Chang et al. | 345/173 |
| 2011/0187677 A1* | 8/2011 | Hotelling et al. | 345/174 |

FOREIGN PATENT DOCUMENTS

| | | |
|---|---|---|
| JP | 58-56190 A | 4/1983 |
| JP | 1993289811 A | 11/1993 |
| JP | 06149463 A | 5/1994 |
| JP | 2005-049978 A | 2/2005 |
| JP | 2005049978 * | 2/2005 |
| JP | 2006-221268 A | 8/2006 |
| WO | 2005116813 A2 | 12/2005 |

OTHER PUBLICATIONS

Michael Macovetskyi, Ruslan Bachynskyy, Ryshtun Andrij, Capacitance Sensing-PC Compatible USB CapSense Matrix Keyboard (AN2407), Cypress Perform, Feb. 16, 2007, Document No. 001-41442 Rev.

Toshiba, Toshiba Matsushita Display Technology to Present at SID 2005, May 19, 2005.

Samsung, Samsung Electronics Introduces Advanced Mobile and Digital Information Displays at SID 2006, Jun. 4, 2006.

Quantum Research Group, 16 and 24 Key QMatrix Touch Sensor ICs (QT60160, QT60240), 2006, Hamble, Great Britain.

Patent Cooperation Treaty; "International Search Report" for International Application No. PCT/US2009/039064; mailed Oct. 30, 2009; 11 pages.

European Patent Office, "Extended European Search Report" for EP Application No. 09735487.2, Jul. 4, 2012, 5 pages.

* cited by examiner

MULTI-TOUCH DETECTION PANEL WITH DISAMBIGUATION OF TOUCH COORDINATES

FIELD OF THE INVENTION

The present invention relates generally to touch pads and touch screens.

BACKGROUND

Touch screens have touch coordinate detection systems mounted at the front of displays (e.g., CRTs, LCDs). Many different types of touch detection systems based on different physical principles have been tried. Examples include touch screens based on optical, acoustical, and electronic technologies and there are numerous variations within each category. Some touch screen technologies use an analog/vector approach to locate touches and therefore do not localize touches on a predetermined grid. However, many types of touch screens localize touches using a fixed 2-D grid which can be based on optical or electrical impedance change sensing.

The category of touch panels that use a predetermined grid can be further sub-divided into two categories. One category is referred to herein as "M×N" (where M and N stand for integers and M×N is the product of those integers). Touch screens in the M×N category effectively divide the sensing area into M×N independent sensors, so that when a touch is detected by an M×N system, both of the coordinates (e.g., the X and Y coordinates) of the touch are determined at once because each individual sensor has a particular X coordinate and a particular Y coordinate. A drawback of some electrical M×N systems is that there are many individual sensors to be interrogated. The number of sensors to be interrogated implies a requirement for a high bandwidth data bus or a slow frame rate for sensing. For certain applications of touch screens, such as hand writing recognition, it is desirable to achieve a high rate of touch coordinate updating, and for such applications M×N systems present limitations.

Another category of touch panels that uses a predetermined grid is referred to herein as "M+N" (where M and N stand for integers and M+N is the sum of those integers). An M+N type touch panel separately detects the X coordinate of touches using one sub-system (e.g., including an array of vertically extending electrodes) and separately detects the Y coordinates using another sub-system (e.g., including an array of horizontally extending electrodes). Generally, for touch screens of practical interest, the integers M and N will have sufficiently high values such that M×N will greatly exceed M+N. Accordingly, an M+N system will require far lower data rates to achieve a certain touch coordinate update rate, and therefore applications that require high touch coordinate update rates such as hand writing recognition are more easily supported.

The above-mentioned separation of the detection of the X and Y coordinates presents no problem if only a single touch is to be detected, because the X and Y coordinates of the single touch are assumed to be correlated. However, in order to support more complicated touch screen interactions (e.g., gestures) it is desirable to be able to detect two or more touches contemporaneously. For example a user can touch a touch screen using their thumb and index finger and move their thumb and index finger along arcuate paths in order to input a rotation command which could then be interpreted to call for rotation of a displayed graphic (e.g., map), for example. In the case of an M+N system that detects the X and Y coordinates separately, two contemporaneous touches (i.e., a multi-touch) can confound the system because the system will be unable to unambiguously associate the two detected X coordinates with the two detected Y coordinates. Consequently, software applications that rely on the M+N touch detection system will be unable to determine if the user called for a clockwise rotation or a counter clockwise rotation, for example.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
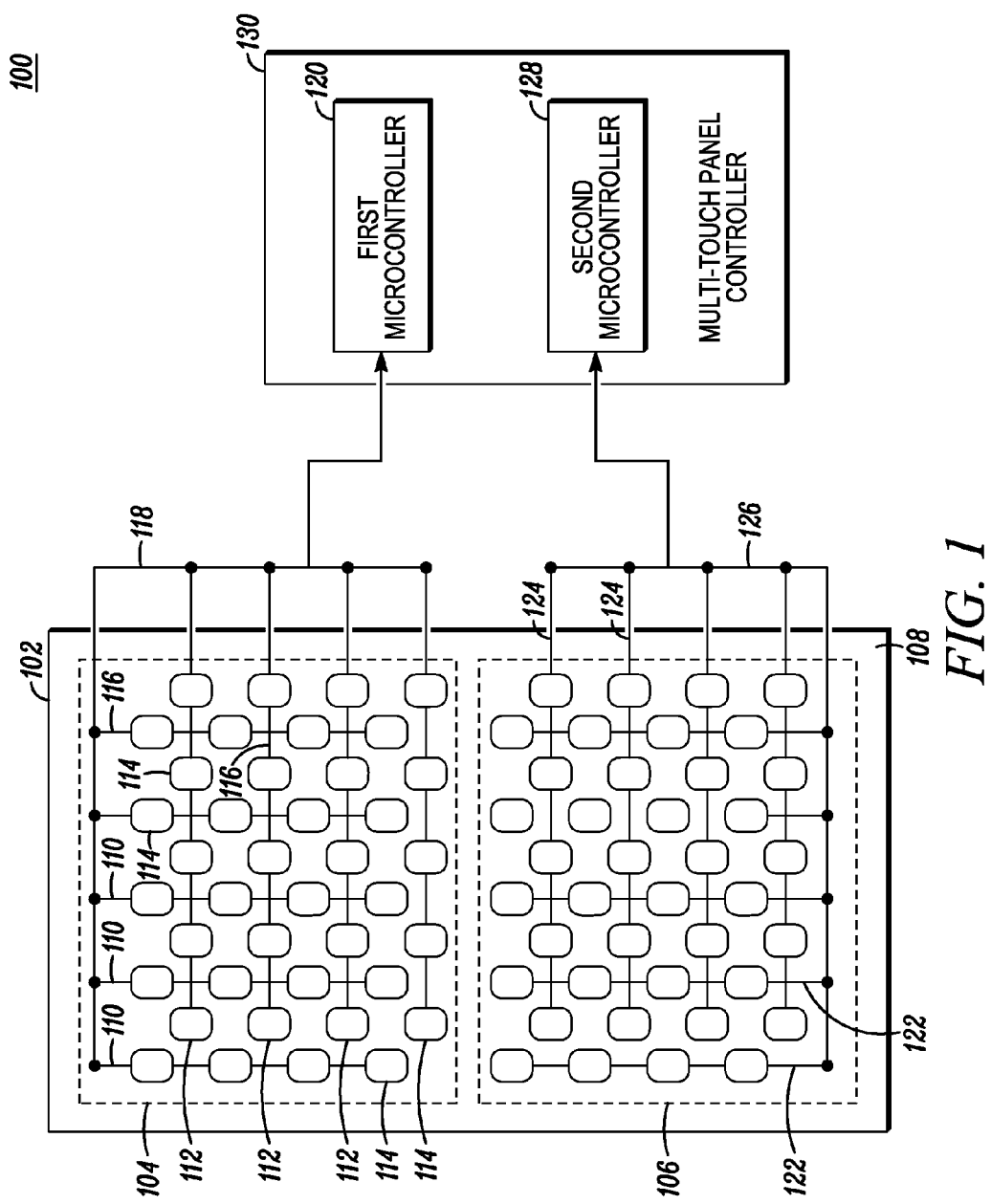
FIG. 1 is a diagram of a multi-touch detection system according to an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to touch screens. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

FIG. 1 is a diagram of a multi-touch detection system 100 according to an embodiment of the invention. As used herein the term "multi-touch detection system" refers to a touch detection system capable of registering more than one contemporaneous touch events. The system 100 includes a multi-touch panel 102 that includes an upper rectangular section 104 and a lower rectangular section 106. Alternatively, the multi-touch panel 102 and its sections could be non-rectangular in shape. The multi-touch panel 102 shown in FIG. 1 is a tandem M+N type capacitive sensing type of multi-touch panel. Alternatively, a multi-touch panel based on a different physical principle could be used such as an optical or resistive sensing type of touch panel. As shown in FIG. 1 the two sections 104, 106 are formed on a common transparent planar base 108, however alternatively the two sections 104, 106 can be formed on separate planar bases that are joined together along edges. The planar base 108 and the electrodes 110, 112 are transparent allowing the touch panel 102 to be suitable for use in a touch screen system, however alternatively, if the system 100 is to be used in a touch pad application, the planar base 108 and the electrodes 110, 112 need not be transparent. In the case that the multi-touch panel is to be transparent the planar base 108 is suitably made of glass or transparent plastic, for example and the electrodes 110, 112 are suitably made of ITO, for example. Rather than using a planar base, alternatively a flexible or conformable base is used, e.g., in a wearable or foldable display application.

A plurality of vertically extending sensing electrodes 110 (of which only three are numbered to avoid crowding the drawing) are positioned side-by-side (in a horizontal array) in the upper rectangular section 104. Additionally a plurality of horizontally extending sensing electrodes 112 are positioned one above another (in a vertical array) in the upper rectangular section 104. The vertically extending sensing electrodes 110 and the horizontally extending sensing electrodes 112 are suitably located on opposite faces of the planar base 108, so that the planar base 108 provides electrical insulation between the two sets of electrodes 110, 112. Alternatively, other provisions are made for insulating the two sets of electrodes 110, 112 from each other. As shown in FIG. 1 both sets of electrodes 110, 112 include pad areas 114 that are connected by narrower width lines 116. The pad areas 114 from the two sets of electrodes 110, 112 do not overlap, only the narrow width lines 116 have a small overlap where they cross. The latter arrangement limits the parasitic capacitive coupling between adjacent electrodes in one of the sets of electrodes 110 (112) by way of electrodes in the other of the sets of electrodes 112 (110). In this way the panel 102 is made more sensitive to capacitance changes induced by a user's touch.

Both of the sets of electrodes 110, 112 are coupled through a first signal bus 118 to a first microcontroller 120. According to one mode of operation, the first microcontroller 120 will interrogate each of the vertically extending sensing electrodes 110 and horizontally extending sensing electrodes 112 separately. The first microcontroller is one form of electrical circuit that may be used to interrogate the sensing electrodes 110, 112; however, alternatively other types of electrical circuits may be used for this purpose. The individual sensing electrodes 110, 112 can be interrogated by applying a signal to measure the capacitance. The capacitance of electrodes proximate a user's touch will change thereby revealing the location of the user's touch. The vertically extending sensing electrodes 110 can determine the X coordinate(s) of a user's touch or multiple contemporaneous touches and the horizontally extending electrodes 112 can determine the Y coordinate(s) of the user's touch or multiple contemporaneous touches. Note that for two contemporaneous touches (e.g., with a thumb and forefinger) there are two X coordinates and two Y coordinates and the system 100 can not necessarily properly pair the X and Y coordinates together—there are four possible pairings only two of which are valid.

Note however that the system also includes the lower rectangular section 106 and that the sections 104, 106 are sized in view of the overall multi-touch panel 102 size and in view of the typical spacing between fingers for supported gestures (e.g., 5 cm for thumb to forefinger multi-touch spacing), such that it can be expected that one touch of a multi-touch (e.g., a forefinger touch) will be in the upper rectangular section 104 of the multi-touch panel 102 and another touch of a multi-touch (e.g., a thumb touch) will be in the lower rectangular section 106 of the multi-touch panel 102.

Similar to the upper rectangular section 104, the lower rectangular section 106 includes a second set of vertically extending sensing electrodes 122 positioned side-by-side (in a horizontal array) and a second set of horizontally extending sensing electrodes 124 positioned one above another (in a vertically array). The second set of vertically extending electrodes 122 and the second set of horizontally extending electrodes 124 are coupled through a second signal bus 126 to a second microcontroller 128 that interrogates the lower rectangular section 106 of the multi-touch panel 102 in a like manner to the interrogation of the upper rectangular section 104 by the first microcontroller 120. The first microcontroller 120 and the second microcontroller 128 are parts of a larger multi-touch panel controller 130. Alternatively, the multi-touch panel controller 130 includes a single microcontroller that interrogates both the sections 104, 106 of the touch panel 102.

Figure 2:
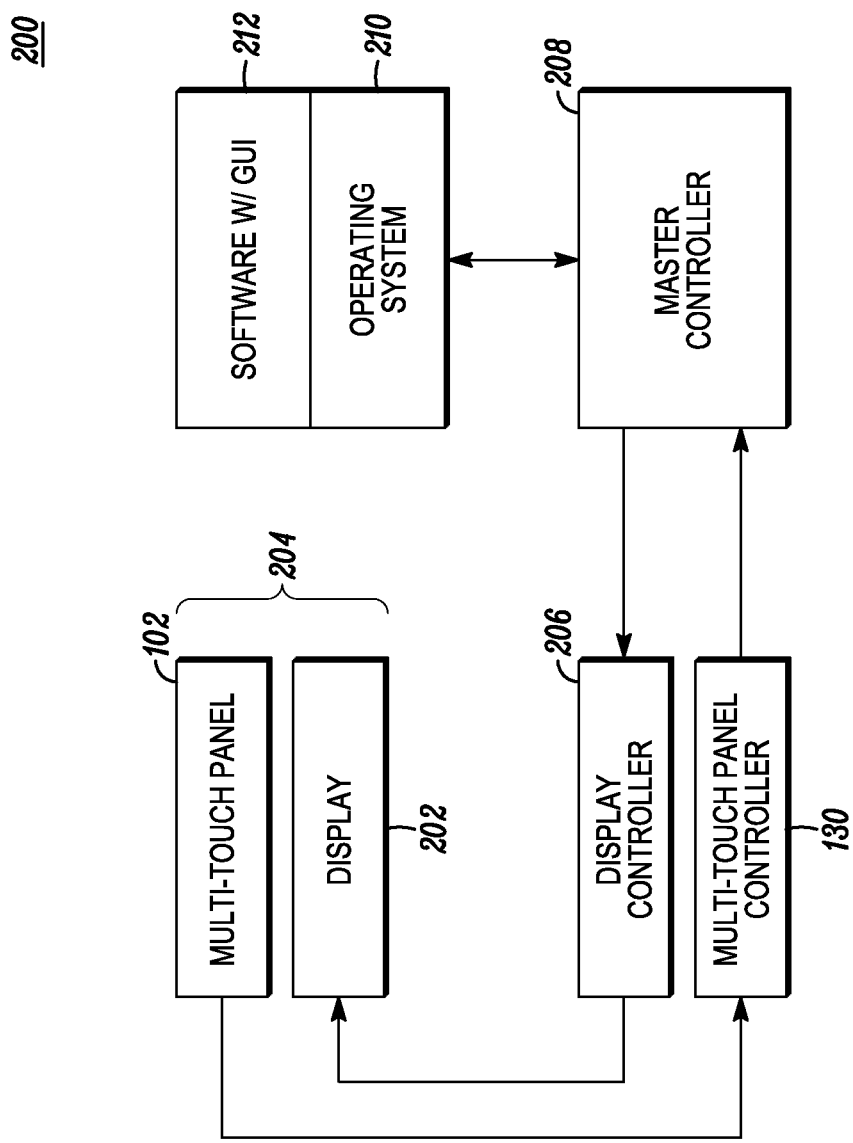
FIG. 2 is a block diagram of an electronic apparatus using the multi-touch detection system shown in FIG. 1.

FIG. 2 is a block diagram of an electronic apparatus 200 using the multi-touch detection system 100 shown in FIG. 1. The apparatus 200 can comprise a smartphone, a Portable Digital Assistant (PDA), a tablet computer, an ultra portable computer, a Digital Video Disk (DVD) player, a remote controller, or an MP3 player, for example. In the electronic apparatus 200, the multi-touch panel 102 is mounted over a display 202 forming a touch screen 204. Alternatively, the multi-touch panel 102 can be functionally integrated with the display. A display controller 206 is drivingly coupled to the display 202 and the multi-touch panel controller 130 is coupled to the multi-touch panel 102. A master controller (e.g., microprocessor) 208 is coupled to the display controller 206 and the multi-touch panel controller 130. The master controller 208 runs an operating system 210 and software 212 that includes Graphical User Interface (GUI) software that supports multi-touch gestures, such as the rotation gesture described above and a non-proportional scaling gesture described below.

Figure 3:
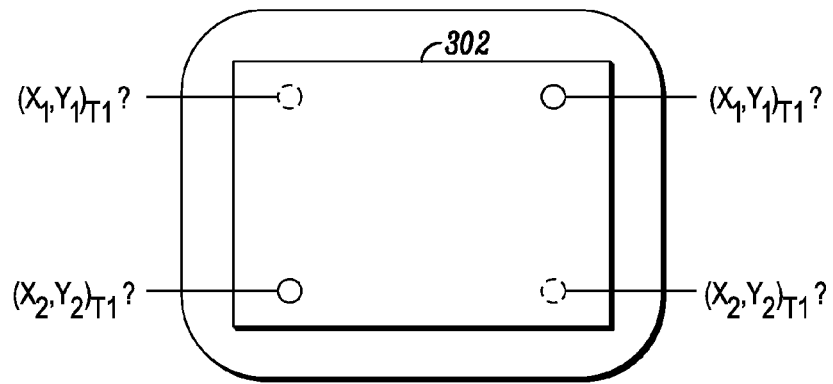
FIG. 3 is an illustration of a prior art M+N touch screen system highlighting the ambiguity in detecting the location of two contemporaneous touches.

FIG. 3 is an illustration of a prior art M+N touch screen system 300 highlighting the ambiguity in detecting the location of two contemporaneous touches. In this case when the user touches a touch panel 302 the system 300 will read out two X coordinates (e.g., Xa and Xb) and two Y coordinates (e.g., Ya and Yb) but will not be able to determine how to properly pair the X and Y coordinates to determine the true locations of the two touches of the multi-touch. For example, is the forefinger's touch (X1, Y1) of the multi-touch represented by (Xa, Yb) or (Xb, Yb)? Also, is the thumb's touch (X2, Y2) of the multi-touch represented by (Xa, Ya) or (Xb, Ya)? Thus, for example, there is an ambiguity as to whether the two touches of the multi-touch are at the upper right and lower left as marked by the solid line circles or at the upper left and lower right as marked by the dashed circles.

In FIGS. 3-6 the subscripts T1 indicates a first touch panel scan period and T2 a subsequent touch panel scan period. M+N touch panels will typically periodically scan the touch panel at a predetermined frame rate.

Figure 4:
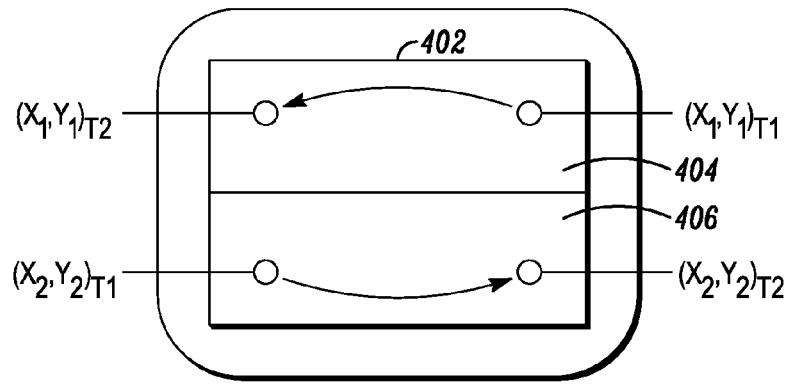
FIG. 4 is a schematic illustration of a touch screen system according to an embodiment of the invention.

FIG. 4 is a schematic illustration of a touch screen system 400 according to an embodiment of the invention. The touch screen system 400 includes a multi-touch panel 402 that includes an upper rectangular section 404 and a lower rectangular section 406. Because the multi-touch panel 402 includes the two sections 404, 406, there is no ambiguity in associating the X and Y coordinates of two touches of a single multi-touch if the two touches are not in the same section 404, 406 of the multi-touch panel 402. Thus, the system 400 can correctly determine the X and Y coordinates of a first touch labeled $(X_1, Y_1)$ and a second touch $(X_2, Y_2)$ of a multi-touch gesture during two successive time periods, labeled $T_1$ and $T_2$. For example, the first touch (X1, Y1) could be using a forefinger and the second touch (X2, Y2) could be using a thumb.

An electronic apparatus e.g., 200, that incorporates the touch screen system 400 is suitably programmed based on ergonomic assumptions on the range of motion of fingers engaged in two contemporaneous touches and under these assumptions the sense of rotation, i.e., clockwise (CW) or counterclockwise (CCW), can be construed based on the detected touch coordinates during two or more successive frame scan periods.

Figure 5:
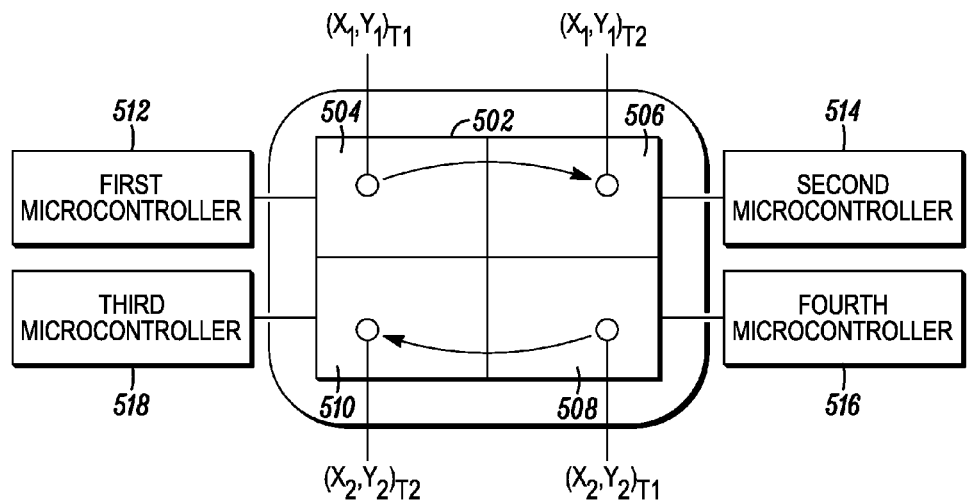
FIG. 5 is a schematic illustration of a touch screen system according to another embodiment of the invention.

FIG. 5 is a schematic illustration of a touch screen system 500 according to another embodiment of the invention. The system 500 includes a touch panel 502 that is divided into four rectangular quadrants including an upper left quadrant 504, an upper right quadrant 506, a lower right quadrant 508, and a lower left quadrant 510. The four quadrants 504, 506, 508, 510 are served by a first microcontroller 512, a second microcontroller 514, a third microcontroller 516, and a fourth microcontroller 518, respectively. Each quadrant 504, 506, 508, 510 in conjunction with its associated microcontroller 512, 514, 516, 518 serves as a sensing sub-system. Alternatively a single microcontroller is used to interrogate all four quadrants. Providing the four quadrants 504, 506, 508, 510 allows touch panel 502 to be able to detect double touches even if both touches are in the lower half or both touches are in the upper half of the touch panel 502. Thus, more variability in the way users execute touch screen gestures can be supported and a greater variety of touch screen gestures can be supported. Note that alternatively the touch panels according to embodiments of the invention can be further subdivided however there will be diminishing returns in terms of supported gestures at the expense of increased complexity and/or bandwidth requirements for the electronics (e.g., microcontrollers) used to read the touch panel.

Initial multi-touches of two fingers are labeled $(X_1, Y_1)_{T1}$ and $(X_2, Y_2)_{T1}$ and final positions of the two touches of a subsequent multi-touch (for the illustrated gesture) are labeled $(X_1, Y_1)_{T2}$ and $(X_2, Y_2)_{T2}$. Such a gesture can be used to enter a rotation command (clockwise, in this example). The rotation command can be used for various purposes, such as for example rotating a graphic displayed by the touch screen system 500.

Figure 6:
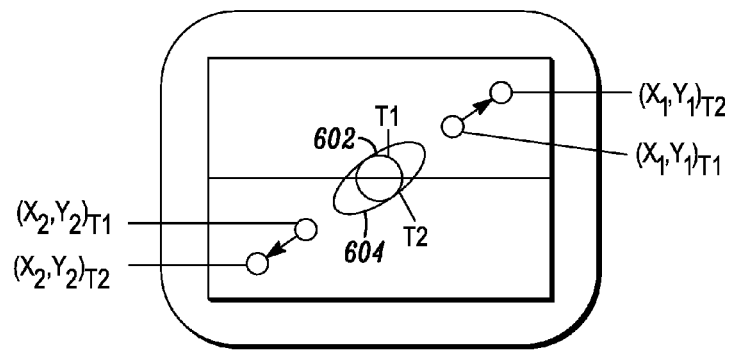
FIG. 6 is a schematic illustration showing how a resizing gesture is detected by a touch screen system according to an embodiment of the invention.

FIG. 6 is a schematic illustration showing how a resizing gesture for a circle 602 is detected by a touch screen 600 system according to an embodiment of the invention. Initially a circle 602 is displayed on the touch screen 600. In order to perform a non-proportional scaling of the circle 602 in a user-specified direction, the user touches two fingers on opposite sides of the circle 602, which the system 600 interprets as an initial multi-touch with coordinates $(X_1, Y_1)_{T1}$ and $(X_2, Y_2)_{T1}$. The direction of scaling is indicated by a combination of the virtual line connecting the positions of the two touches of the initial multi-touch and the virtual line connected the positions of the two touches of a subsequent multi-touch. One example of such a gesture occurs when the virtual line associated with the initial touch and the virtual line associated with the final touch are collinear. In this case, the user spreads the two fingers apart in order to enter a scaling command. A subsequent multi-touch is detected by the system and determined to be at coordinates $(X_1, Y_1)_{T2}$ and $(X_2, Y_2)_{T2}$. Based on the differences between the coordinates of the initial multi-touch (e.g., $(X_1, Y_1)_{T1}$ and $(X_2, Y_2)_{T1}$) and the coordinates of the subsequent multi-touch (e.g., $(X_1, Y_1)_{T2}$ and $(X_2, Y_2)_{T2}$), the circle is then stretched into an ellipse 604 with its major axis inclined in a direction indicated by the user's two detected multi-touches. Alternatively, the user may draw the two fingers together whereby the said circle would be reformed into an ellipse having its minor axis inclined in a direction indicated by the user's two detected multi-touches. This is but one example of a two multi-touch gesture that can be supported. Other gestures comprised of combinations of rotation gestures and non-proportional scaling gestures, e.g., gestures in which the aforementioned virtual lines associated with an initial multi-touch and subsequent multi-touch are not collinear, can also be supported.

Figure 7:
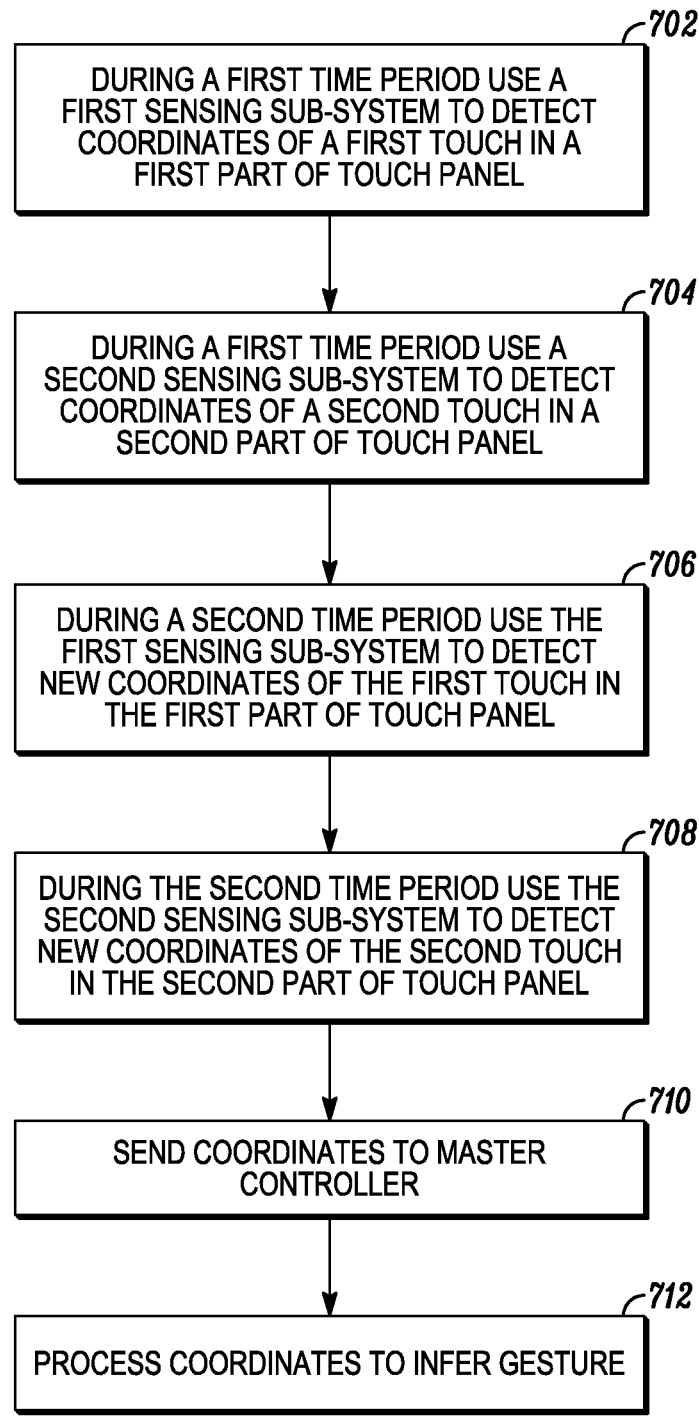
FIG. 7 is a flowchart of a method of detecting a two-touch touch screen gesture according to an embodiment of the invention.

FIG. 7 is a flowchart of a method 700 of detecting a two-touch touch screen gesture according to an embodiment of the invention. The method 700 can be implemented in software that is stored in a memory and executed by a processor that is coupled to a touch panel structured according to embodiments described above. In block 702, during a first time period, a first sensing sub-system (e.g., upper rectangular section 104 and first microcontroller 120) is used to detect coordinates (e.g., X and Y coordinates) of a first touch of an initial multi-touch in a first part of a touch panel. In block 704, also during the first time period, a second sensing sub-system (e.g., the lower rectangular section 106 and the second microcontroller 128) is used to detect coordinates of a second touch of the initial multi-touch in a second part of the touch panel. In block 706 during a second time period following the first time period, the first sensing sub-system is used to detect new coordinates of a first touch of a subsequent multi-touch in the first part of the touch panel.

Note that some embodiments contemplated may be programmed to assume that touches by the same finger are always in the same half (e.g., upper or lower) of the touch panel, however this does not apply to all embodiments. This assumption is based in part on ergonomic considerations for the range of motion of the human hand while engaged in contemporaneous thumb and index finger touches and also on the assumption that the user will be instructed through a user manual to perform touch screen gestures in a certain manner.

In block 708, also during the second time period, the second sensing sub-system is used to detect new coordinates of a second touch of the subsequent multi-touch in the second part of the touch panel. In block 710 the detected touch coordinates are sent to a master controller (e.g., 206) and in block 712 the coordinates are processed to infer a gesture such as a CW or CCW rotation or a scaling command, for example.

Alternatively rather than providing a touch panel based on Cartesian coordinates, a touch panel based on polar coordinates or another coordinate system can be used.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of touch panels described herein. The non-processor circuits may include, but are not limited to, a radio receiver, a radio transmitter, signal drivers, clock circuits, power source circuits, and user input devices. As such, these functions may be interpreted as steps of a method to perform touch panel functions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A multi-touch detection system comprising:
   a touch panel comprising a first section and a second section, wherein said first section and said second section are formed on a common base and are based on the same physical principle for touch detection;
   a first sensing subsystem for:
   separately detecting, at a first time period T1, a first coordinate of a pair of coordinates and a second coordinate of said pair of coordinates for a first touch of said first section; and
   separately detecting, at a successive second time period T2 following after said first time period T1, said first coordinate of said pair of coordinates and said second coordinate of said pair of coordinates for new coordinates of the first touch of said first section; and
   a second sensing subsystem for:
   separately detecting, at said first time period T1, a first coordinate of a pair of coordinates and a second coordinate of said pair of coordinates for a second touch of said second section, and
   separately detecting, at said successive second time period T2 following after said first time period T1, said first coordinate of said pair of coordinates and said second coordinate of said pair of coordinates for new coordinates of the second touch of said second section;
   wherein said first touch of said first section and said second touch of said second section are contemporaneous and in different locations; and
   a master controller, coupled to the first sensing subsystem and the second sensing subsystem, for interpreting changes in the sensed pairs of coordinates for the first touch of said first section and the second touch of the second section, between the first time period T1 and the second time period T2, as a single multi-touch gesture for entering a command to a display controller.

2. The multi-touch detection system according to claim 1 wherein said first section and said second section are rectangular in shape and said first coordinate and said second coordinate are Cartesian coordinates.

3. The multi-touch detection system according to claim 2 further comprising:
   a third section and a fourth section;
   a third sensing subsystem for separately detecting said first coordinate of said pair of coordinates for each touch of said third section and separately detecting said second coordinate of said pair of coordinates for each touch of said third section; and
   a fourth sensing subsystem for separately detecting said first coordinate of said pair of coordinates of each touch of said fourth section and separately detecting said second coordinate of said pair of coordinates for each touch of said fourth section.

4. The multi-touch detection system according to claim 3 wherein said first section and said second section are arranged side-by-side and said third section and said fourth section are arranged side-by-side; and wherein said first section and said second section are arranged above said third section and said fourth section respectively.

5. The multi-touch detection system according to claim 1 wherein said first sensing subsystem comprises:
   a first plurality of electrodes;
   and said second sensing subsystem comprises:
   a second plurality of electrodes, and
   wherein said first plurality of electrodes and said second plurality of electrodes are coupled to at least one electrical circuit that is adapted to measure changes in electrical capacitance of said electrodes induced by touches.

6. The multi-touch detection system according to claim 5 wherein said at least one electrical circuit comprises at least one microcontroller.

7. The multi-touch detection system according to claim 6 wherein said at least one microcontroller comprises:
   a first microcontroller and a second microcontroller,
   wherein said first microcontroller is coupled to said first plurality of electrodes and said second microcontroller is coupled to said second plurality of electrodes.

8. The multi-touch detection system according to claim 5 wherein said at least one electrical circuit is adapted to measure changes in capacitance.

9. The multi-touch detection system according to claim 5 wherein said first plurality of electrodes and said second plurality of electrodes are transparent.

10. The multi-touch detection system according to claim 9 further comprising a display.

11. The multi-touch detection system according to claim 1 further comprising a display.

12. The multi-touch detection system according to claim 1 wherein said first section and said second section are juxtaposed.

13. The multi-touch detection system according to claim 1 wherein said physical principle comprises one of: optical, acoustical, resistive, and capacitive.

14. A method of detecting multiple touches comprising:
   at a first time period T1 using a first sensing sub-system to detect coordinates of a first touch in a first part of a touch panel;

at said first time period T1 using a second sensing subsystem to detect coordinates of a second touch in a second part of said touch panel;

at a successive second time period T2 following after the first time period T1, using the first sensing sub-system to detect new coordinates of the first touch in the first part of said touch panel; and at the successive second time period T2 following after the first time period T1, using the second sensing sub-system to detect new coordinates of the second touch in the second part of said touch panel, wherein said first part and said second part of said touch panel are formed on a common base and are based on same physical principle for touch detection, further wherein said first touch of said first part and said second touch of said second part of said touch panel are contemporaneous, and wherein changes, between the first time period T1 and at the second time period T2, in the coordinates of the first touch of said first section and the second touch of the second section are interpreted as a single multi-touch gesture.

15. A method of detecting multiple touches according to claim 14 wherein said first touch of said first part and said first touch of said second part of said touch panel are in different locations.

16. A user interface comprising:
a display; and
a multi-touch detection system, said multi-touch detection system comprising:
a touch panel overlying said display said touch panel comprising:
    a first section and a second section formed on a common base;

a first sensing subsystem for:
separately detecting, at a first time period T1, a first coordinate of a pair of coordinates for each touch of said first section and separately detecting a second coordinate of said pair of coordinates for each touch of said first section, and separately detecting, at a successive second time period T2 following after said first time period T1, said first coordinate of said pair of coordinates for new coordinates of each touch of said first section and separately detecting said second coordinate of said pair of coordinates for new coordinates of each touch of said first section; and a second sensing subsystem for:
separately detecting, at said first time period T1, a first coordinate of a pair of coordinates of each touch of said second section and separately detecting a second coordinate of said pair of coordinates for each touch of said second section, and separately detecting, at said successive second time period T2 following after said first time period T1, said first coordinate of said pair of coordinates for new coordinates of each touch of said second section and separately detecting said second coordinate of said pair of coordinates for new coordinates of each touch of said second section;

wherein said each touch of said first section and said each touch of said second section are contemporaneous; and wherein changes, between the first time period T1 and at the second time period T2, in the coordinates of each touch of said first section and each touch of said second section are interpreted by a master controller as a single multi-touch gesture for changing a graphic on the display.

* * * * *